United States Patent
Elliott

[19]

[11] Patent Number: 6,027,147
[45] Date of Patent: Feb. 22, 2000

[54] INTERNAL FLEXIBLE DUST SEAL

[76] Inventor: Stephen Elliott, 6180 Greenwood Dr. #201, Falls Church, Va. 22044

[21] Appl. No.: 08/995,005

[22] Filed: Dec. 19, 1997

Related U.S. Application Data

[60] Provisional application No. 60/035,280, Jan. 3, 1997.
[51] Int. Cl.$^7$ ..................................................... F16L 27/10
[52] U.S. Cl. ........................... 285/229; 285/49; 285/397; 277/607
[58] Field of Search .............................. 285/49, 227, 229, 285/300, 397; 277/607, 627, 634, 654

[56] References Cited

U.S. PATENT DOCUMENTS

| | | | |
|---|---|---|---|
| 3,070,130 | 12/1962 | Risley | 285/300 X |
| 3,128,220 | 4/1964 | Gracer | 285/49 X |
| 3,712,649 | 1/1973 | Martin | 285/397 |
| 4,090,726 | 5/1978 | Mischel | 285/229 |
| 4,140,338 | 2/1979 | Kazmierski, Jr. et al. | 285/229 |
| 4,289,338 | 9/1981 | Cook | 285/229 |
| 4,299,414 | 11/1981 | Bachmann | 285/300 X |

FOREIGN PATENT DOCUMENTS

| | | | |
|---|---|---|---|
| 2266095 | 10/1975 | France | 285/227 |

*Primary Examiner*—Eric K. Nicholson
*Assistant Examiner*—Greg Binda
*Attorney, Agent, or Firm*—Alfred F. Hoyte, Jr.

[57] ABSTRACT

An internal flexible dust seal for connecting and accomodating misalignment, expansion, contraction, and torsion between openings of adjacent ducts carrying dust and particulate laden hot gases. The internal flexible dust seal can undergo lateral, axial, angular, and torsional movements while at the same time keeping any particulate matter or dust from leaving the duct and/or entering the space between liner plates and the insulation cavity of an outer gas flexible seal or expansion joint. The internal flexible dust seal is fixed to the inside of the duct.

15 Claims, 3 Drawing Sheets

6,027,147

INTERNAL FLEXIBLE DUST SEAL

CROSS REFERENCE TO RELATED APPLICATIONS

This application claims priority based upon Provisional Application No. 60/035,280, filed Jan. 3, 1997.

BACKGROUND

1. Field of the Invention

This invention relates to expansion joints for industrial ducts and piping.

2. Discussion of Prior Art

Existing flexible gas seals and expansion joints for industrial ducts with gas stream temperatures over 500° F. employ a standard design and construction as described in U.S. Pat. No. 4,063,755 to Merz, Dec. 20, 1977. This standard design incorporates an inner metal flow liner plate, an insulation cavity filled with high temperature insulation, and an outer gas seal fixed to flanges. The inner metal flow liner forms the inner part of the insulation cavity, and helps to protect the insulation cavity and outer expansion joint gas seal from gas stream abrasion. The inner metal flow liner plate is welded or otherwise affixed to one section of the duct. The other end of the flow liner plate is not affixed to the other mating duct section, and there is a gap of varying size that permits the mating duct sections to slide over each other as the duct moves in response to temperature induced expansion. This gap between the flow liner and the mating duct section is determined mainly by the amount of lateral or side to side movement that the duct undergoes in operation. The larger the lateral movement of the two duct sections relative to each other, the larger this gap between the flow liner and mating duct section. The longitudinal movement of the duct does not have an effect on this gap. This standard design works well with gas streams that are not dust or particulate laden.

In dusty or particulate laden gas streams, this gap between the flow liner and the mating duct section permits the entry of dust and particulates into the insulation cavity between the flow liner and the outer gas seal expansion joint. Even though the cavity is usually filled with insulation material, the dust and particulates can build up, in some cases quite rapidly. As the mating duct sections expand and contract towards each other over time, the dust/particulates build up in the insulation cavity and become hard packed to such an extent that the outer flexible gas seal or expansion joint ruptures prematurely from the pressure of the built up dust/particulates. This problem is particularly acute in horizontal ducts with very fine dust or particulates. Complicated systems of tightly overlapping metal flow liner plates as described in U.S. Pat. No. 3,730,566 to Kasmierski et al., May 1, 1973 have been tried but are both expensive and difficult to apply, will not work in cases where there are both large torsional and large lateral or side to side duct movements, and still incorporate small gaps between the sliding metal liners that permit dust build up in the insulation cavity. Packings placed in the gap between liner and mating duct have also been tried but would have a tendency to become dislodged, would not have enough elasticity to form a tight seal after repeated duct movements, and would not work at all in cases of large lateral or side to side duct movements. Another possible solution is the incorporation of cleanout holes into the cavity for periodic cleaning of the dust build up, but this becomes a maintenance problem and will not generally work because of the hard packing of the dust/particulates.

OBJECTS AND ADVANTAGES

It is an object and advantage of the invention to provide an internal flexible dust seal to prevent dust or particulates from entering the insulation cavity of an expansion joint.

It is an object and advantage of the invention to provide an internal flexible dust seal to prevent and/or delay mechanical rupture and failure of the outer gas seal expansion joint.

It is an object and advantage of the invention to provide an internal flexible dust seal to prevent the seize up of the expansion joint due to hard packing of the dust in the insulation cavity.

It is an object and advantage of the invention to provide an internal flexible dust seal to provide for greatly increased longevity of all dusty duct flexible gas seals and expansion joints.

It is an object and advantage of the invention to provide an internal flexible dust seal which reduces maintenance costs because replacement of the internal flexible dust seal can be done from the inside of large industrial ducts, thereby avoiding the erection of extensive scaffolding outside the duct in hard to reach areas.

It is an object and advantage of the invention to provide an internal flexible dust seal which is very easily installed.

It is an object and advantage of the invention to provide an internal flexible dust seal that is easily adaptable to different duct sizes and geometry.

It is an object and advantage of the invention to provide an internal flexible dust seal that can accommodate large angular, lateral, longitudinal, and torsional misalignments and movements of adjacent duct openings.

It is an object and advantage of the invention to provide an internal flexible dust seal that can resist extreme high temperatures.

It is an object and advantage of the invention to provide an internal flexible dust seal that can resist gas stream abrasion.

Further objects and advantages of my invention will become apparent from a consideration of the drawings and the ensuing description.

BRIEF SUMMARY

An internal flexible dust seal for industrial ducts and piping for high temperatures is provided. The internal flexible dust seal can undergo large lateral, axial, and torsional movements while at the same time keeping any particulate matter or dust from entering the space between liner plates and the insulation cavity of an outer flexible gas seal or expansion joint. The internal flexible dust seal is fixed to the inside of the duct.

LIST OF REFERENCE NUMERALS AND LETTERS

9 Sealing member.
10 Internal flexible dust seal.

11 Mounting studs for internal flexible dust seal.
12 Clamping bars for internal flexible dust seal.
13 Gas stream deflector plate for internal flexible dust seal.
14 A first duct flow liner.
15 A first duct section.
16 A second duct section—adjacent to or mating to a first duct section 15.
17 Insulation cavity.
18 Insulation.
19 Outer gas seal expansion joint.
20 Angle flanges for outer gas seal expansion joint.
21 Clamping bars for outer gas seal expansion joint.
22 Bolting hardware for outer gas seal expansion joint.
23 Bolting nut for internal flexible dust seal.
24 A second duct flow liner.
25 Slotted holes in clamping bars.
30 High temperature flexible silica, fiberglass, or other fabric forming a cuff around the end of the sealing member.
31 High temperature flexible stainless steel or other coarse mesh.
32 High temperature flexible stainless steel or other fine mesh.
33 High temperature flexible silica, fiberglass, or other fabric.
34 High temperature flexible stainless steel or other thin foil.
35 High temperature flexible silica, fiberglass, or other fabric.
36 High temperature flexible stainless steel or other fine mesh.
37 High temperature flexible stainless steel or other coarse mesh.
X gap between a first duct flow liner 14 of a first duct section 15 and a second duct flow liner 24 of a second duct section 16.
Y distance from inner dimensions of a first duct section 15 and inner dimensions of a first duct flow liner 14.
C free flexible length of internal flexible dust seal. clamping bar width.
E overall length or installation height of outer gas seal.
F outer gas seal clamping flange width.
G outer gas seal clamping flange dimension.
H duct internal dimensions.
I internal dimensions of a first duct flow liner 14.

DETAILED DESCRIPTION OF THE INVENTION

Figure 1:
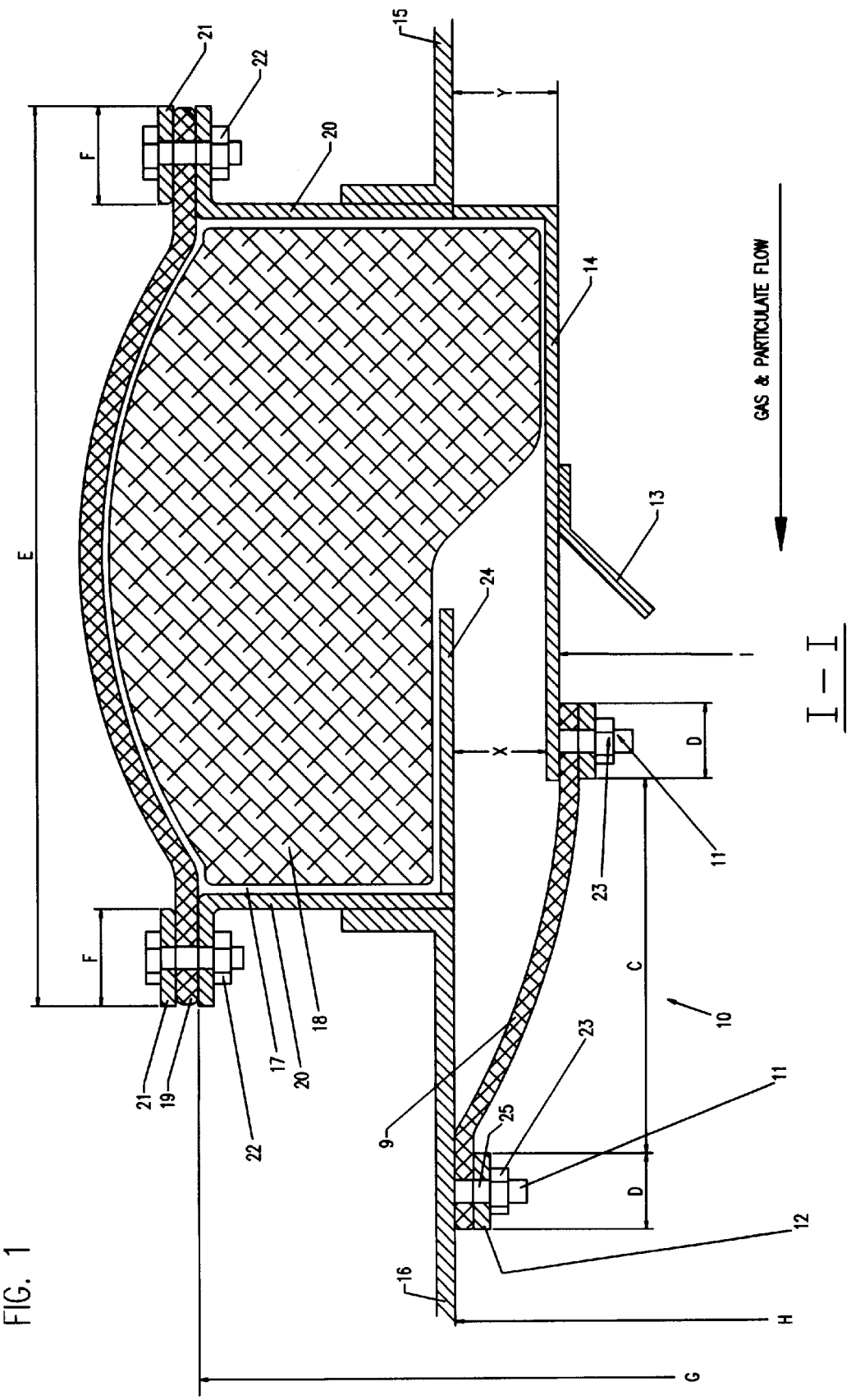
FIG. 1 is a sectional view of the internal flexible dust seal and general arrangement of an outer expansion joint gas seal, through one side of a portion of a round duct.
Figure 2:
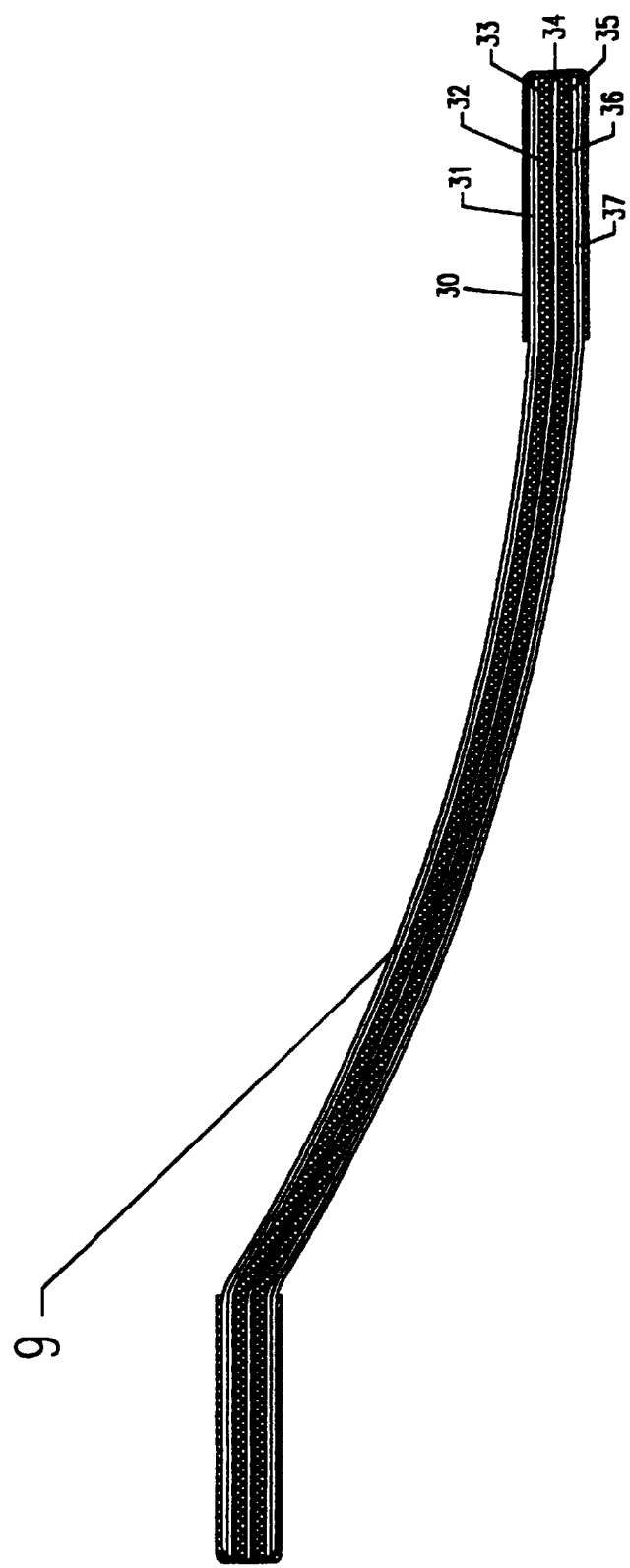
FIG. 2 is a section view of the layer structure of the sealing member.
Figure 3:
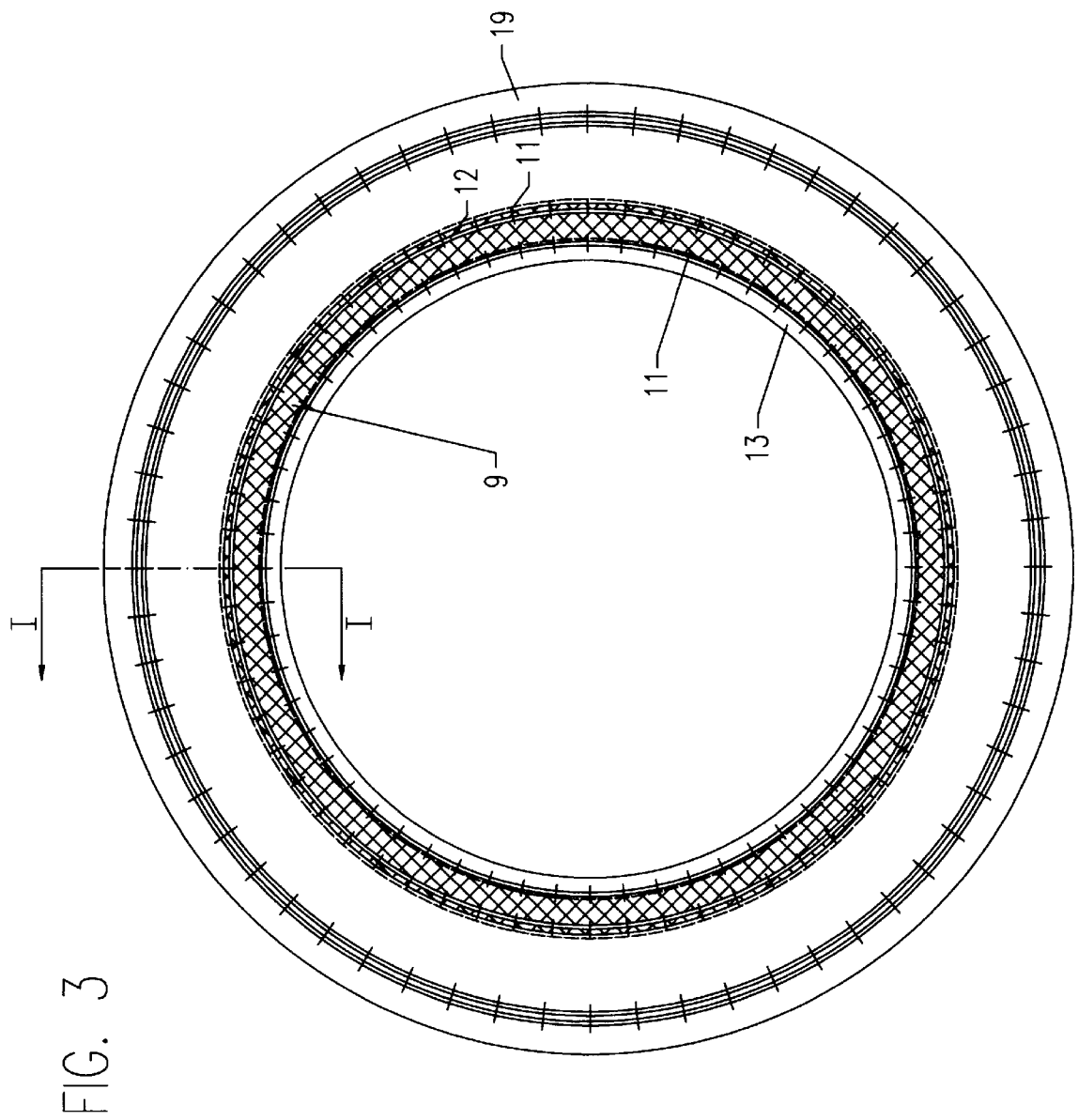
FIG. 3 is a typical round duct through section view of a typical general arrangement of the internal flexible dust seal and outer expansion joint gas seal, with the section taken perpendicular to the duct axis.

Referring now to FIGS. 1–3 a typical installment of the invention is shown, generally indicated by the numeral 10. The internal flexible dust seal 10 of the present invention includes a general arrangement for an outer gas seal 19, including flanges 20, insulation cavity 17, and insulation 18. There is illustrated in FIG. 1 a section view through one side of a portion of an industrial duct for carrying hot gases, showing particularly the flexible connector arrangement between two adjacent duct sections. The purpose of the flexible connector arrangement or expansion joint is for connecting ends of adjacent ducts or piping in a manner permitting or accommodating misalignments and/or thermal expansion or contraction between the adjacent duct ends. When dust and particulates build up in the insulation cavity of an expansion joint, the adjacent duct sections cannot move freely relative to each other because the hard packed dust makes a solid connection between duct sections. Therefore, the expansion joint as a whole no longer allows movement between the adjacent duct sections. The flexible connector between the adjacent duct ends maintain a gas and particulate seal against evacuation of the flow medium in the duct during operation.

Misalignments and/or expansion or contraction movements between adjacent duct ends can occur in all directions, and include compression and expansion of the adjacent ends along the axis of the duct, lateral displacements, angular and torsional movements of one end relative to the other.

A flange 20 is seal welded or otherwise attached around the complete outer dimensions of a first duct section 15. A first duct flow liner 14 is seal welded or integrally attached to the flange 20 to form a partial cover over an outer gas seal insulation cavity 17 and thereby keep insulation 18 from degrading and falling into the duct. A gas stream deflector plate 13 for an internal flexible dust seal 10 is welded or otherwise attached to the first duct flow liner 14 to protect the internal flexible dust seal 10 from abrasion due to the gas and particulate medium flow. The internal flexible dust seal 10 includes a sealing member 9 which is affixed by means of clamping bars 12, mounting studs 11, and hex nuts 23 at one end around the complete internal dimensions of the first duct flow liner 14. The mounting studs 11 are regularly spaced apart and end welded or otherwise affixed to the first duct flow liner 14 and a second duct section 16 as shown. The clamping bars 12 are generally flat, have slotted holes 25 to match the stud pattern, and are formed to match the internal dimensions of both the first duct flow liner 14 and the second duct section 16. The other end of the sealing member 9 is affixed to the second duct section 16 using the mounting hardware above described including clamping bars 12, mounting studs 11, and hex nuts 23. The flange 20 is seal welded or otherwise attached around the complete outer dimensions of the second duct section 16. A liner 24 is seal welded or integrally attached to the flange 20 to form a partial cover over an outer gas seal insulation cavity 17 and thereby keep the insulation 18 from degrading and falling into the duct. Insulation 18 fills an insulation cavity 17 and provides thermal protection for an outer gas seal expansion joint 19. The outer gas seal expansion joint 19 is affixed to the flanges 20 using clamping bars 21 and mounting hardware 22. The hole spacing for the mounting hardware 22 and clamping bars 21 is regular.

C is the free flexible length of the internal flexible dust seal 10. The free flexible length C is determined by the amount and type of movement of the adjacent duct sections 15 and 16 relative to each other. D is the clamping bar width of the clamping bars 12. E is the overall length or installation height of the outer gas seal 19. F is the outer gas seal 19 clamping flange width. G is the outer gas seal 19 clamping flange dimensions. H is the duct internal dimensions. I is the first duct flow liner 14 internal dimensions. X is the gap between the first duct flow liner 14 of the first duct section 15 and adjacent or mating second duct flow liner 24 of the second duct section 16. Y is the distance from the inner dimensions of the first duct section 15 to the inner dimensions of the first duct flow liner 14.

FIG. 2 shows a section view of the sealing member 9. High temperature flexible silica, fiberglass or other fabric forms a cuff 30 around each end or side of the sealing member 9. High temperature flexible stainless steel or other coarse mesh forms a first inner layer 37, and provides abrasion protection to the other outer layers and seals against larger particulates. In the preferred embodiment, the first inner layer 37 is the most abrasion resistant layer. High temperature flexible stainless steel or other fine mesh forms a second layer 36, and again provides abrasion protection to the other outer layers and seals against smaller particulates. High temperature flexible silica, fiberglass, or other fabric forms a third layer 35, and cushions and protects—both statically and under dynamic movement—a high temperature flexible stainless steel or other thin foil fourth layer 34, and helps to seal out fine dust. High temperature flexible stainless steel or other thin foil forms a fourth layer 34, providing an absolute fine dust seal. High temperature flexible silica, fiberglass, or other fabric forms a fifth layer 33, that cushions and protects the high temperature flexible stainless steel or other thin foil fourth layer 34, and helps to seal out fine dust. High temperature flexible stainless steel or other fine mesh forms a sixth layer 32, providing reinforcement and helps to keep the layer structure together, as does the final seventh layer 31 of high temperature flexible stainless steel or other coarse mesh. The whole is joined together generally at the ends or sides where the cuffs 30 are. The ends or cuffs 30 may be joined together by either sewing using high temperature silica or stainless steel or other thread, or by using a high temperature silicone or other adhesive. The cuffs 30 or sides of the sealing member 9 have punched holes not shown to fit the stud or bolt pattern.

The sealing member 9 is an endless conical formed belt, flat belt, or convoluted bellows type of construction affixed—as mentioned above—on one side or cuff 30 to the inside of a first duct flow liner 14 that is in turn attached to a first duct section 15, and on the other side or cuff 30 to an adjacent second duct section 16 to form a tight dust seal. The sealing member 9 is flexible enough to allow for large misalignments and movements of adjacent duct sections relative to each other. It easily accommodates large torsional, lateral, and axial movements of adjacent duct sections in industrial ducts carrying high temperature gases, dust and particulates, and completely prevents dust from building up in the insulation cavity. By preventing this buildup of hard packed dust in the insulation cavity, the outer gas seal expansion joint can continue to provide a gas seal without prematurely bursting from the dust buildup pressure. Also, the internal flexible dust seal prevents the expansion joint from seizing up due to hard packing of the dust and particulates in the insulation cavity.

The embodiments of the invention in which an exclusive property or privilege is claimed are defined as follows:

I claim:

1. An internal dust seal apparatus for connection between the mating end portions of adjacent generally concentrically aligned duct sections, each of said duct sections having both male and female end portions, said male end portion forming a flow liner and having a slightly smaller diameter than said female end portion and being inserted thereinto, said male and female end portions having flexible external sealing means connected across space therebetween, both of said male and female end portions having interior and exterior surfaces, said internal dust seal apparatus comprising:

an endless flexible belt having a continuous main body with opposing ends;

first connection means for connecting one of said opposing ends to said interior surface of said male end portion, and second connection means for connecting the other of said opposing ends to said interior surface of said female end portion;

said first and second connection means securing said belt interiorly of said duct sections thereby preventing the accumulation of particulate matter in the space between said male and female end portions.

2. The internal flexible dust seal apparatus of claim 1 wherein said deflector plate is secured to said internal surface of said male end portion upstream of said belt.

3. The internal flexible dust seal of claim 1 wherein said main body has a plurality of layers.

4. The internal flexible dust seal of claim 3 wherein said layers may be dissimilar materials.

5. The internal flexible dust seal of claim 3 wherein one of said layers is a stainless steel mesh.

6. The internal flexible dust seal of claim 1 wherein said first and second connection means comprise a plurality of regularly spaced clamping bars which are adapted to apply sufficient pressure to seal the ends of said belt to the interior surfaces of said male and female ends of the adjacent duct sections.

7. An apparatus for conducting a hot, abrasive, or chemically active gas stream comprising:

a plurality of adjacent generally concentrically aligned duct sections, each of said adjacent duct sections having opposing end portions with a space therebewteen;

sealing members connected between the end portions of each of the adjacent duct sections and extending across the space between said end portions, each of said sealing members being continuous and having a central opening therethrough, said sealing members having opposing ends attached to interior surfaces of said end portions of the duct sections for eliminating the accumulation of dust and particulate matter in the space between end portions of the adjacent duct sections.

8. The apparatus of claim 7 wherein each of said deflector plates has a first portion sealingly engaged to the interior surface of a respective one of said duct sections, and a deflecting portion extending inwardly from said first portion into said gas stream.

9. The apparatus of claim 7 wherein said sealing members have a plurality of layers.

10. The apparatus of claim 9 wherein said layers may be dissimilar materials.

11. The apparatus of claim 9 wherein one of said layers is non-porous.

12. The apparatus of claim 9 wherein one of said layers is temperature resistant.

13. The apparatus of claim 9 wherein one of said layers abrasion resistant.

14. The apparatus of claim 9 wherein one of said layers is a stainless steel mesh.

15. The apparatus of claim 14 wherein said deflector plates are connected upstream of said sealing members.

* * * * *